(12) United States Patent
Moriconi et al.

(10) Patent No.: US 9,077,724 B2
(45) Date of Patent: *Jul. 7, 2015

(54) SYSTEMS AND METHODS FOR ANALYZING APPLICATION SECURITY POLICIES

(75) Inventors: Mark Moriconi, Atherton, CA (US); Ken Yagen, San Carlos, CA (US)

(73) Assignee: Mark Moriconi, Atherton, CA (US)

( * ) Notice: Subject to any disclaimer, the term of this patent is extended or adjusted under 35 U.S.C. 154(b) by 353 days.

This patent is subject to a terminal disclaimer.

(21) Appl. No.: 13/330,590

(22) Filed: Dec. 19, 2011

(65) Prior Publication Data

US 2012/0124643 A1    May 17, 2012

Related U.S. Application Data

(63) Continuation of application No. 11/360,122, filed on Feb. 23, 2006, now Pat. No. 8,117,640.

(60) Provisional application No. 60/655,833, filed on Feb. 23, 2005, provisional application No. 60/655,794, filed on Feb. 23, 2005, provisional application No. 60/655,855, filed on Feb. 23, 2005.

(51) Int. Cl.
*H04L 9/00* (2006.01)
*H04L 29/06* (2006.01)

(52) U.S. Cl.
CPC .............. *H04L 63/102* (2013.01); *H04L 63/20* (2013.01)

(58) Field of Classification Search
CPC ................................ H04L 63/20; H04L 63/12
See application file for complete search history.

(56) References Cited

U.S. PATENT DOCUMENTS

| 2004/0221174 A1* | 11/2004 | Le Saint et al. ............... 713/201 |
| 2005/0108537 A1* | 5/2005 | Puri et al. ....................... 713/176 |
| 2007/0180490 A1* | 8/2007 | Renzi et al. ....................... 726/1 |

* cited by examiner

*Primary Examiner* — Brandon Hoffman
*Assistant Examiner* — Nega Woldemariam
(74) *Attorney, Agent, or Firm* — Carr & Ferrell LLP

(57) ABSTRACT

A system and method for analyzing application security policies is provided. One or more application security policies are retrieved. An optimized policy is then generated utilizing the one or more application security policies. One or more queries related to the one or more application security policies are received. The one or more queries are decomposed. The one or more decomposed queries are then processed utilizing the optimized policy.

7 Claims, 17 Drawing Sheets

Client

Server

Aggregate

Distribute

Notify

Configure System

Edit Policy

Provision Policy

Edit Administration Policy

SYSTEMS AND METHODS FOR ANALYZING APPLICATION SECURITY POLICIES

CROSS-REFERENCE TO RELATED APPLICATIONS

The present application is a continuation of U.S. non-provisional patent application Ser. No. 11/360,122 filed on Feb. 23, 2006 now U.S. Pat. No. 8,117,640 and entitled "Systems and Methods for Analyzing Application Security Policies," which claims the benefit and priority of U.S. provisional patent application Ser. No. 60/655,833 filed Feb. 23, 2005 and entitled "Systems and Methods for Analyzing Application Security Policies in a Heterogeneous Environment," U.S. provisional patent application Ser. No. 60/655,794 filed Feb. 23, 2005 and entitled "Consistency Checking of Application Security Policies," and U.S. provisional patent application Ser. No. 60/655,855 filed Feb. 23, 2005 and entitled "Systems and Methods for Fast Analysis of Complex Application Security Policies," all of which are herein incorporated by reference.

BACKGROUND OF THE INVENTION

1. Field of the Invention

The present invention relates generally to enterprise security policies, and more particularly to systems and methods for analyzing application security policies.

2. Description of Related Art

Conventionally, large companies have hundreds or even thousands of applications, each with their own specialized security policy. The current practice is to manage application security policies independently, even though they may be interrelated. Consequently, it is an expensive and unreliable proposition to modify application security policies and analyze them for properties such as compliance with regulatory requirements.

SUMMARY OF THE INVENTION

A system and method for analyzing application security policies is provided. In a method according to some embodiments, one or more application security policies are retrieved. An optimized policy is then generated utilizing the one or more application security policies. One or more queries related to the one or more application security policies are received. The one or more queries are decomposed. The one or more decomposed queries are then processed utilizing the optimized policy.

DESCRIPTION OF EXEMPLARY EMBODIMENTS

Figure 1:
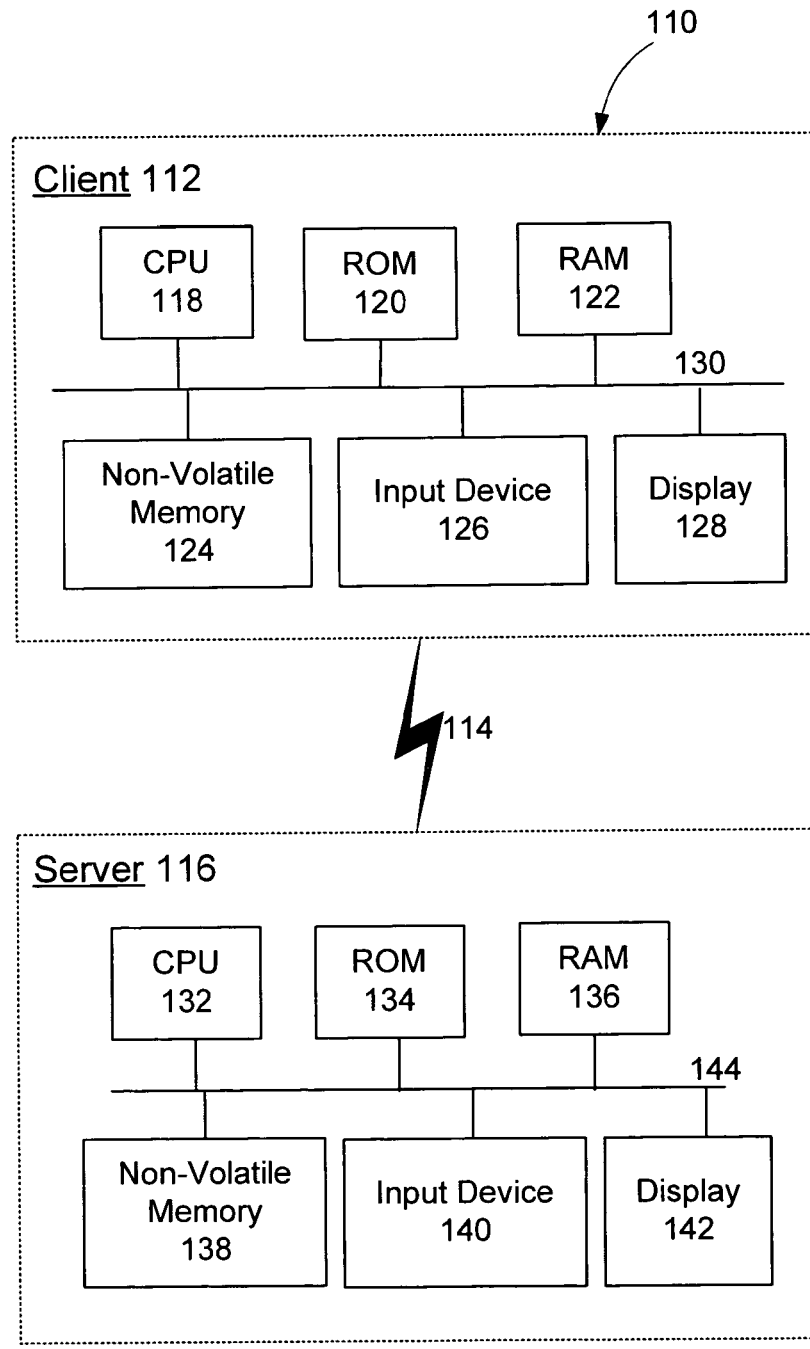
FIG. 1 is a block diagram of an exemplary system, according to some embodiments.

FIG. 1 shows an exemplary embodiment of a distributed computer network system 110, including a client 112 connected over a network 114 to a server 116. One server 116 is shown, but client 112 may be connected to one or more servers 116, according to exemplary embodiments. In FIG. 1, client 112 may include a central processing unit (CPU) 118, a read-only memory (ROM) 120, a random-access memory (RAM) 122, a non-volatile memory 124, an input device 126, and a display 128, all connected by a bus 130. The client 112 comprises any type of computing device, such as a server, a workstation, a laptop, a personal digital assistant (PDA), a mobile phone, and so forth.

Similarly, server 116 may include a central processing unit (CPU) 132, a read-only memory (ROM) 134, a random-access memory (RAM) 136, a non-volatile memory 138, an input device 140, and a display 142, all connected by a bus 144. The server 116 comprises any type of computing device, such as a mainframe, network device, server, a workstation, a laptop, and so forth.

Although FIG. 1 illustrates client 112 connected to server 116, client 112 may be connected to one or more other clients 112 via network 114 according to some embodiments. Further, although FIG. 1 illustrates various components associated with client 112 and server 116, fewer or more components may be associated with client 112 and/or server 116 and still fall within the scope of various embodiments.

Figure 2:
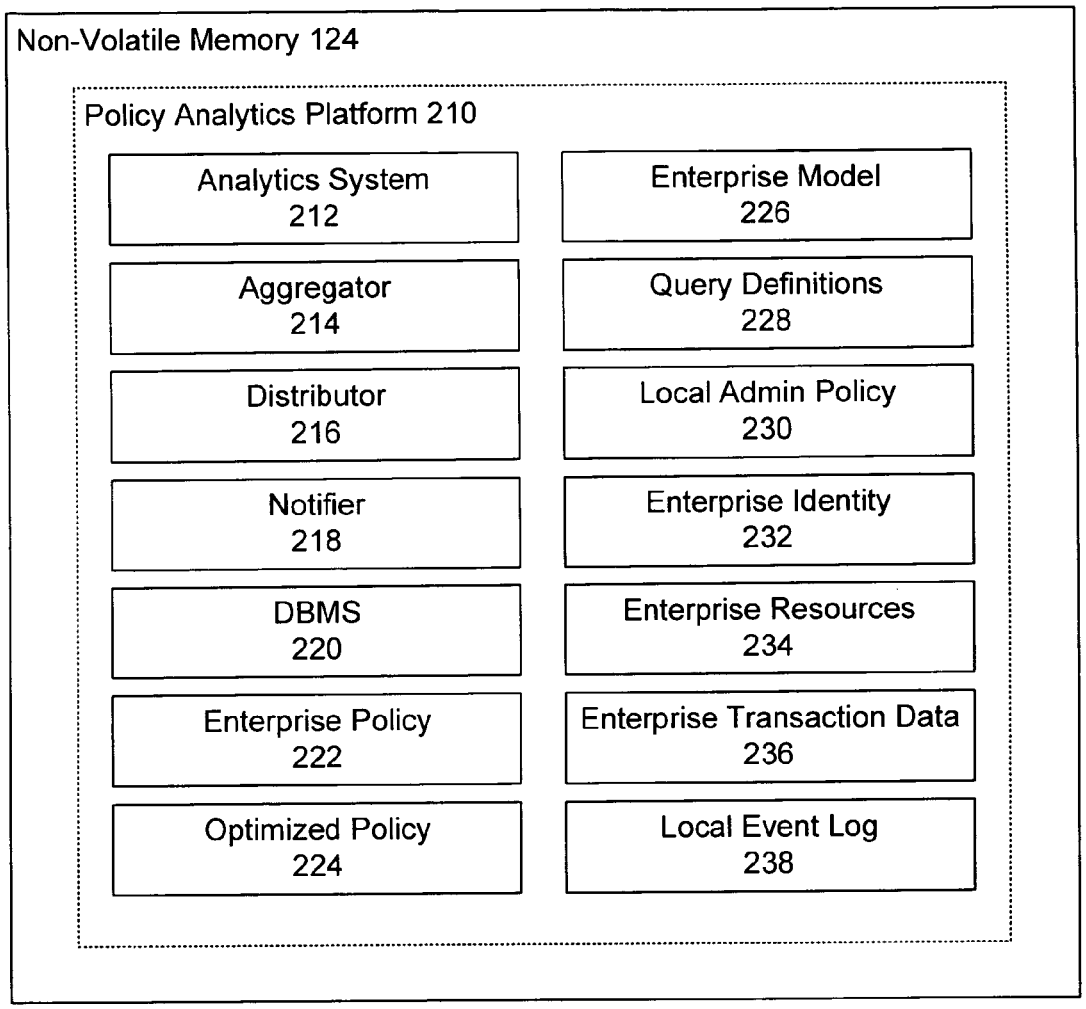
FIG. 2 is a block diagram of an exemplary non-volatile memory associated with the client in FIG. 1, according to some embodiments.

Referring now to FIG. 2, a block diagram of one embodiment of non-volatile memory, such as non-volatile memory 124, discussed in FIG. 1, is shown. In FIG. 2, non-volatile memory 124 includes a policy analytics platform 210 that may analyze, manage, and/or distribute application security policies.

An application security policy may specify all of the access required to execute transactions in terms of "policy rules" that describe what resources a user can access and under what conditions the user can access them. In various embodiments, a policy rule comprises a subject, a resource, an action, and/or an optional condition. By way of illustration, in the rule "a person, identified by a patient number, may read any record for which the person is the designated patient," "patient number" is the subject, "record" is the resource, "read" is the action, and "designated patient" is the condition. However, any type of policy rule may be provided and/or any type of variables, such as the subject, the resource, the action, the optional condition, and so forth may be provided in association with the policy rule according to some embodiments.

In one embodiment, the policy rule may be specified in the following format:

effect(subject, resource, action) IF condition

However, the policy rule may comprise any format according to other embodiments.

In various embodiments, the effect may have the value "Permit" (permit access) or "Deny" (deny access). Generally, the subject is permitted to perform the action on the resource provided the associated condition evaluates to "True."

In various embodiments, the subject may represent, but is not limited to, one or more users, groups, roles, systems, and/or processes. By way of illustration, a group may represent one or more users, systems, and/or processes. Organizational structures may be modeled in terms of hierarchies associated with groups in which members of child groups may implicitly include group memberships associated with parent groups. In various embodiments, the subject may be assigned to one or more roles, and then assigned an access capability by policy rules through the subject's role. For example, if a user is in the role "medical doctor," the user has all of the access rights assigned to medical doctors.

In various embodiments, the resource may represent an application, a component of an application, information, a service, a function, a device and/or any suitable entity that can be interacted with programmatically. By way of illustration, resources may include various application resources, operating system resources, and network resources including, but not limited to, Enterprise Application Archive (EAR) files and components; Web Application Archive (WAR) files and components; applets; program objects and methods; Microsoft COM and .NET components; Uniform Resource Identifiers (URI) and Uniform Resource Locators (URL); user interface components such as buttons, menus, fields, commands, labels, text boxes, and tables; database components such as databases, tables, fields, columns, rows, stored procedures, triggers, and views; directory components such as objects, object classes, attributes, naming context, and distinguished names; content management components such as documents, video, audio, email, and images; web services; CORBA objects; messages and message queues; and file system, storage system, operating system, and network system components such as ports, services, processes, files, directories, volumes, shares, subnets, and IP addresses.

In various embodiments, the action may represent an operation on the resource. By way of illustration, the actions may include, but are not limited to, permission to view a URL, to update an account balance, to execute a transaction, and/or to read or write a database element, directory element, or a file.

In various embodiments, the condition may represent a logical expression that, when instantiated, evaluates to "True," "False," or "Indeterminate." For example, as discussed herein, the subject is permitted to perform the action on the resource provided the associated condition evaluates to "True." In one embodiment, a condition may involve Boolean operators such as "not," "and," and/or "or;" relational operations such as $=,<,>,>=,<=$; regular expressions; set operations such as "in," "not in," "eq," intersection, union, subset, at least one member of; custom functions defined outside the policy, such as higher-order operators, data type or domain specific computations and processing, and accessing remote resources. Parameters of conditions may have a type, such as string, boolean, integer, double, currency, time, date, URI, hex, base64, IP Address, DNS Name, X500 Name, or email address, according to exemplary embodiments.

The condition may also refer to attributes. According to some embodiments, the attributes comprise characteristics of the subjects, the resources, the actions, and/or an environment. The environment comprises the set of attributes that may be relevant to the condition and independent of any particular subject, resource, and/or action. By way of illustration, the user attribute may include an office location or a functional title, while an application attribute may include a network address associated with the application, and an environment attribute may include the time of day. However, any type of attribute and/or environment is within the scope of various embodiments.

In one embodiment, a combining algorithm ensures that there is only one answer to each query. It is possible for different policy rules to generate conflicting results. Combining algorithms may resolve such conflicts to arrive at one outcome per policy per query. By way of illustration, a combining algorithm may specify that, if any rule in the application security policy evaluates to "Deny," access is denied, even if access is granted by a "Permit" rule in the same application security policy. In various embodiments, the application security policy comprises a set of one or more policy rules and one rule-combining algorithm. Any type of combining algorithm may be employed according to some embodiments.

In various embodiments, the application security policy may be structured. A structured application security policy comprises the application security policy with an associated formal grammar that effectively defines a parser that obtains the structure of each associated policy rule by applying the grammatical rules to each policy rule, according to some embodiments. By way of illustration, structured application security policies may be represented as XML documents or files that conform to any of several formats, including fixed-length fields and records, delimited fields and records, and comma separated values. However, any type of data that comprises the structured application security policy is within the scope of various embodiments.

In various embodiments, the application security policy may be unstructured. An unstructured application security policy may comprise the application security policy that does not include a formal grammar and may be represented as a text string (sequence of characters). However, any type of data may comprise the unstructured application security policy according to some embodiments.

Referring now to the exemplary embodiment in FIG. 2, policy analytics platform 210 includes an analytics system 212 to analyze, manage, and/or provision the application security policies throughout a distributed, heterogeneous computing environment. An aggregator 214 may retrieve the application security policies from application systems (310). A distributor 216 may provision application security policies to application systems (310). A notifier 218 may send alerts when specified events occur. A database management system (DBMS) 220 may store an enterprise policy 222, an optimized policy 224, an enterprise model 226, query definitions 228, a local administration policy 230, enterprise identity 232, enterprise resource 234, enterprise transaction data 236, and a local event log 238. Although policy analytics platform 210 is described as including various components or programs in FIG. 2, fewer or more components or programs may comprise policy analytics platform 210 and still fall within the scope of some embodiments. Policy analytics platform 210 is further discussed herein in conjunction with FIGS. 4-7 and FIGS. 10-15.

Figure 3:
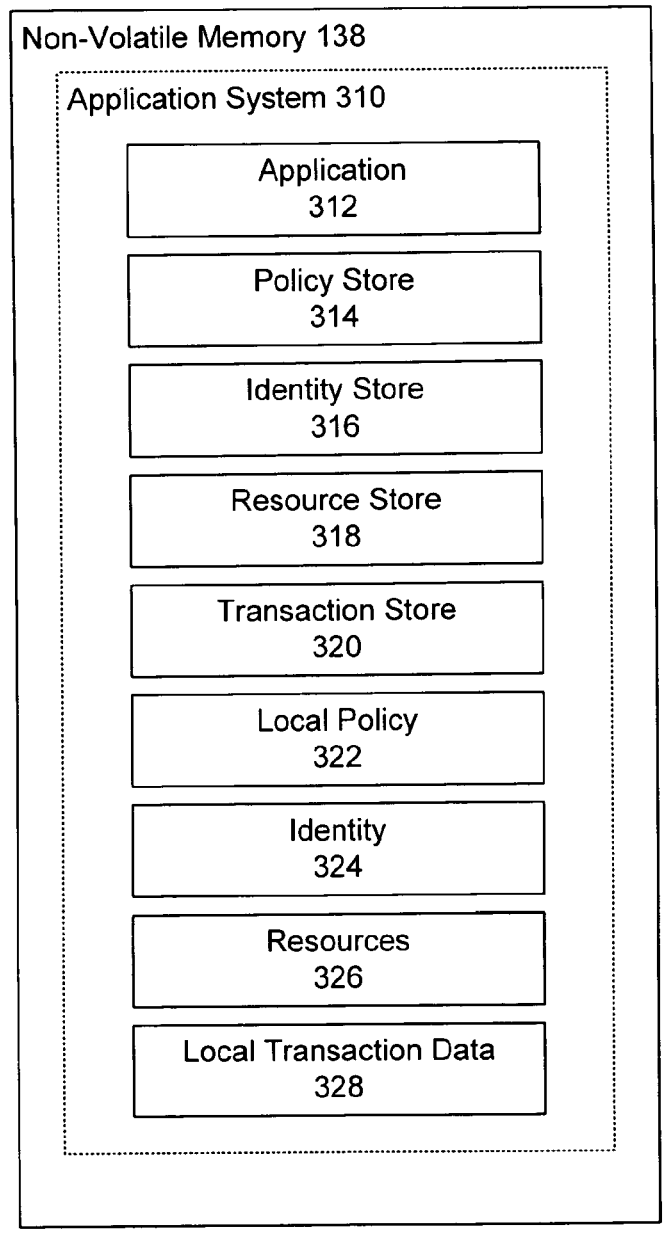
FIG. 3 is a block diagram of an exemplary non-volatile memory associated with the server in FIG. 1, according to some embodiments.

FIG. 3, a block diagram of one embodiment for an exemplary non-volatile memory, such as non-volatile memory 138 located within server 116 discussed in FIG. 1, illustrates an application system 310 that may include an application 312 and several associated data stores. Local policy 322 may comprise the application security policy associated with application 312 according to some embodiments. Local policy 322 may be stored in a policy store 314. Identity 324 and resource 326 information associated with application 312 may be stored in identity store 316 and resource store 318, respectively. The transaction history for application 312 may be stored in local transaction store 320. One or more application systems 310 may be located within one or more servers 116. Application system 310 is discussed in further detail herein in conjunction with FIG. 8.

Figure 4:
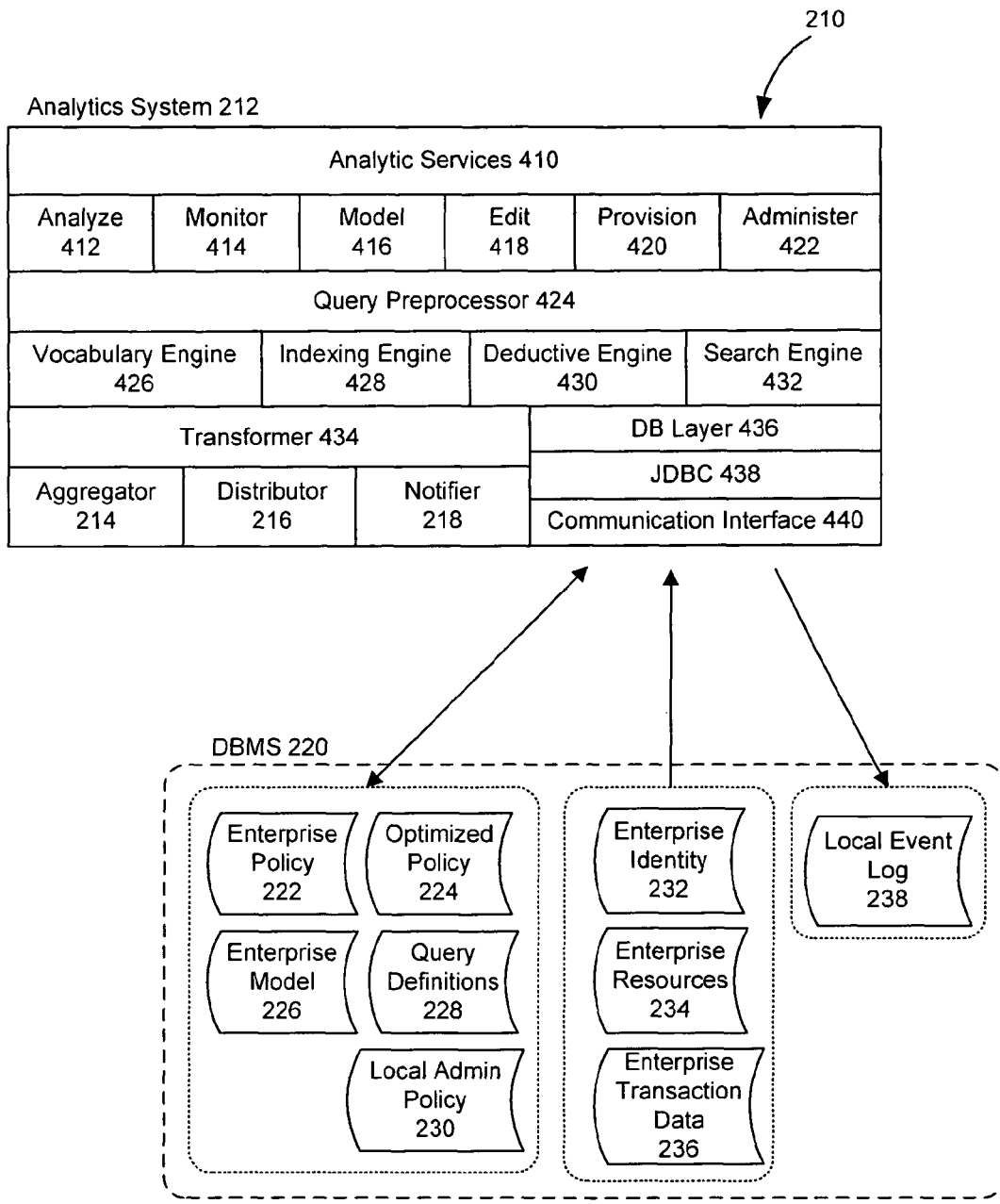
FIG. 4 is a block diagram of an exemplary policy analytics platform associated with the non-volatile memory of FIG. 2, according to some embodiments.

FIG. 4 shows a block diagram of one embodiment of a policy analytics platform 210, located within non-volatile memory 124 of FIG. 2, or otherwise associated with non-volatile memory 124. Analytics system 212 may include analytic services 410, which may comprise the analyze 412 services, monitor 414 services, model 416 services, edit 418 services, provision 420 services, and administer 422 services. The services associated with analytics system 212 are further discussed herein in conjunction with FIGS. 10-15.

A "system user" may comprise a user who can interact, directly or indirectly, with analytic services 410 through an application, an application component, a service, or any suitable entity that can interact programmatically, or via a computing device, with analytics system 212. For example, an application may comprise a trading system, a patient record system, a customer relationship management system, or a calendar.

FIG. 4 further shows exemplary elements in database management system 220 associated with analytics system 212. The elements may include, but are not limited to, the following:

Enterprise policy 222 may include one or more of the structured application security policies and one or more of the unstructured application security policies for applications 312. In one embodiment, enterprise policy 222 may store structured application security policies in their native format and in a common format suitable for analytic services 410. By way of illustration, the eXtensible Access Control Markup Language, or XACML, may serve as a common representation for structured application security policies. Unstructured application security policies may be stored in their native format.

Optimized policy 224 may include an indexed representation of enterprise policy 222 for fast query evaluation. By way of illustration, subject, object, action triples and flattened role hierarchies in structured application security policies may be indexed; expanded queries may be indexed; and various policy components such as user names, resource names, and special combinations of components may be indexed in unstructured application security policies.

Enterprise model 226 may include configuration information for aggregator 214, distributor 216, and/or notifier 218, and/or metadata required to analyze application security policies including, but not limited to, transaction models, vocabulary mappings, and alerts.

Query definitions 228 may include parameterized and executable queries. By way of illustration, parameterized queries may comprise queries that may be executed by specifying the name of the query and the values of the parameters. By way of illustration, executable queries may comprise predefined queries that can be rerun without system user intervention and that eliminates the need to type in the query each time the query is issued. By way of illustration, query definitions may include complex separation of duty queries that determine whether a subject has conflicting access within or across application security policies. By way of illustration, alert configurations may specify when to issue an alert and where to send the alert.

Local administration policy 230 may include the application security policy that controls access to analytic services 410.

Enterprise identity 232 may include subject information in one or more identity stores 316 in one or more application systems 310.

Enterprise resources 234 may include resources from one or more resource stores 318 in one or more application systems 310.

Enterprise transaction data 236 may include the transaction history from one or more transaction stores 320 in one or more application systems 310.

Local event log 238 may include audit data internal to policy analytics platform 210. By way of illustration, the event log may include a record of every interaction with services 412, 414, 416, 418, 420, 422, including any changes to elements in database management system 220.

Referring now to analytics system 212 in FIG. 4, aggregator 214 updates enterprise policy 222 by collecting local policies 322 associated with application systems 310. In one embodiment, if local policy 322 is a structured application security policy, aggregator 214 may transform the structured application security policy into the Extensible Markup Language, or XML, and if local policy 322 is unstructured, aggregator 214 may leave the unstructured application security policy in the unstructured application security policy's native format. The operation of the aggregator program is further discussed herein in conjunction with FIG. 5.

In various embodiments, transformer 434 transforms structured application security policies into a common format and stores the structured application security policies in the structured format in enterprise policy 222. By way of illustration, transformer 434 may convert structured XML policies from aggregator 214 into structured XACML policies by applying structure-to-structure transformations using XQuery or Extensible Stylesheet Language Transformations (XSLT). By way of illustration, if the order of policy rules is critical in evaluating the policy, transformations may be used to establish the proper order.

In various embodiments, indexing engine 428 creates index tables for structured and unstructured application security policies in enterprise policy 222, and then stores the index tables in optimized policy 224.

In various embodiments, vocabulary engine 426 may associate an abstract name with one or more concrete names that appear in enterprise policy 222. For example, the abstract concept of a trading system may be represented in an enterprise policy 222 by the names "Trading" and "Trades." The vocabulary engine 426 may facilitate querying by making explicit that "Trading" and "Trades" denote the same abstract trading system.

In various embodiments, deductive engine 430 decides whether a subject can perform an action on a resource by evaluating an extended authorization request against one or more structured application security policies in optimized policy 224. By way of illustration, an extended authorization request may comprise a base query consisting of a policy rule with no variables and a context containing the relevant attributes for the associated subject, resource, action, and environment. Deductive engine 430 may evaluate a base query to truth value "True" provided the base query is logically implied by the relevant structured application security policies; otherwise the base query may evaluate to "False" or "Indeterminate."

In various embodiments, deductive engine 430 may calculate specific answers to general queries. By way of illustration, the condition in a query may ask for specialized information that is not explicit in the relevant policies. For example, a query may ask "Can JDoe access account #529 on weekdays?" If the underlying policy allows access only on Tuesday, deductive engine 430 may find that Tuesday is a weekday and return "JDoe can access account #529 only on Tuesday."

In various embodiments, query preprocessor 424 may transform queries into an extended authorization request to deductive engine 430. By way of illustration, a query may include a base query, a policy rule with quantified variables and a context containing the relevant attributes for the one or more associated subjects, resources, actions, and environments, and/or various logical combinations of the base queries and the queries. The query may contain "don't care" values to indicate that the subject, the resource, and/or the action, as well as the attributes in the query context, may be ignored by deductive engine 430.

In various embodiments, query preprocessor 424 transforms a query into one or more decomposed queries that, according to one embodiment, are base queries. The query preprocessor 424 may apply vocabulary mappings to the query or the decomposed query through communication with vocabulary engine 426. Query preprocessor 424 may identify the applicable structured application security polices through communication with indexing engine 428. Query preprocessor 424 passes the one or more base queries and the applicable policies to deductive engine 430 for evaluation.

By way of illustration, query preprocessor 424 may decompose queries by expanding "forall" functions (universal quantification) and "exists" functions (existential quantification) to form a finite number of base queries. By way of illustration, query preprocessor 424 may transform the query "find every customer who can access account 5562" into a separate query for each person in the customer role, and then make an authorization request to deductive engine 430 for each of the queries.

By way of illustration, a cross-application query may contain the names of subjects, resources, actions, and/or roles associated with multiple applications 312. According to some embodiments, some of the names may denote the same object. For example, user "John Doe" may be named "JDoe" in one policy and "JohnD" in another, and resource "Claims Processing" may be named "Claims" in one policy and "ClaimsSystem" in another. Query preprocessor 424 may use vocabulary engine 426 to create an equivalent set of queries that take aliased names into account.

In various embodiments, search engine 432 may search indexed text with search criteria based on words and phrases. By way of illustration, a search query may be represented by a search expression involving various operations to include, but not limited to, "all words in this list," "exact phrase," at least one of these words," and "without these words."

In various embodiments, query preprocessor 424, based on an input search query, may apply vocabulary mappings to the extent possible through vocabulary engine 426. Query preprocessor 424 identifies the applicable structured and unstructured application security policies through indexing engine 428 and decomposes the search expressions, such as "JDoe" OR "JohnD," into appropriate base expressions. Search indexes are selected through indexing engine 428 and the base expressions are evaluated through search engine 432, which may return a list of "hits." According to one embodiment, the hits may be ordered by a score, such as a numeric value of relevance.

In various embodiments every element in database management system 220 may be indexed and searched as text, and structured application security policies may additionally be searched by attribute. By way of illustration, policies represented in XACML are structured hierarchically and can be searched with respect to various fields, including "subject," "resource," and "action" fields.

In various embodiments, aggregator 214 may collect local policy 322, identity 324, resources 326, and local transaction data 328 from application systems 310 and store them in the appropriate elements in database management system 220. Aggregator 214 may also collect transactional data from application systems 310 and store the transactional data in enterprise transaction data 236.

In various embodiments, distributor 216 provisions changes in enterprise policy 222 to application system 310 for use in controlling access to application system's 310 local resources. The operation of this program is further discussed below in conjunction with FIG. 6.

In various embodiments, notifier 218 sends alerts to system users, systems, or processes whenever monitor 414 detects an alert condition. Alerts are further discussed herein in conjunction with FIG. 7.

In various embodiments, analytics system 212 requests to database management system 220 pass through database layer (DB layer) 436, Java Database Connectivity layer (JDBC) 438, which provides a common interface to vendor-specific databases, and communication interface 440, which provides database drivers.

Figure 5:
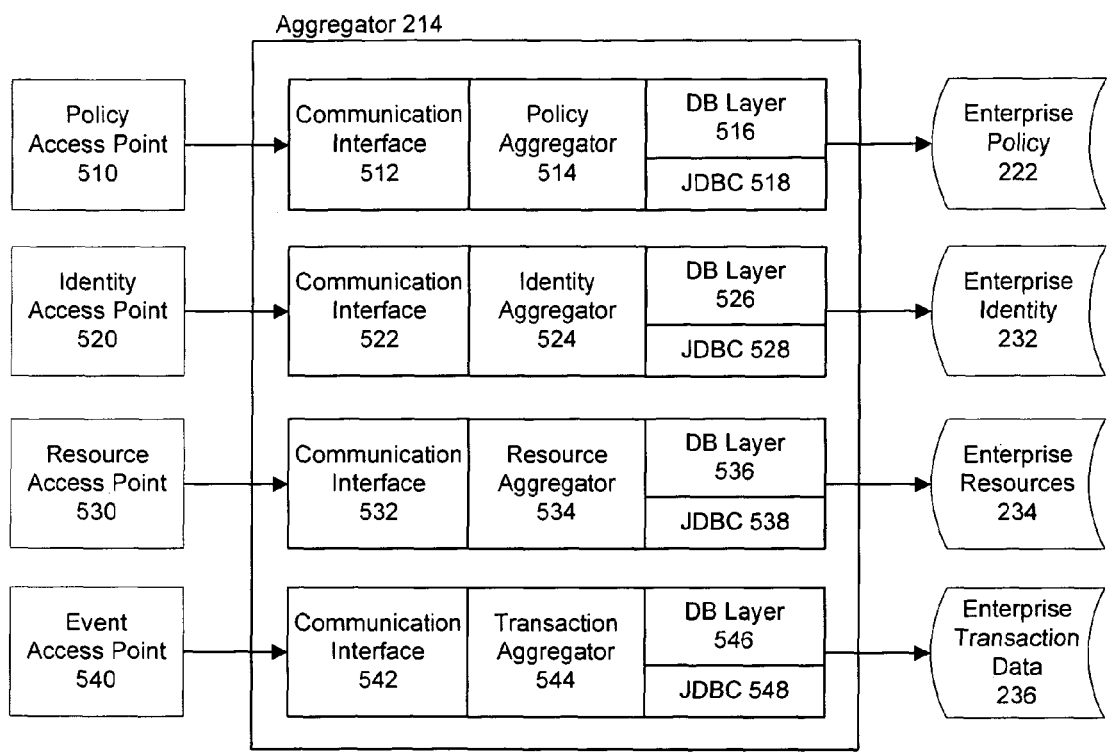
FIG. 5 is a block diagram of an exemplary aggregator associated with the policy analytics platform in FIG. 4, according to some embodiments.

Referring now to FIG. 5, aggregator 214 may collect policy, identity, resource, and event information from application system 310. Aggregator 214 may run in a different process or on a different computer than analytics system 212. Similarly, policy layer 512, 514, 516, 518; identity layer 522, 524, 526, 528; resource layer 532, 534, 536, 538; and transaction layer, 542, 544, 546, 548 may each run in different processes or on different computing devices.

According to one embodiment, policy aggregator 514 retrieves policy information associated with application system 310 through communication interface 512 to policy access point 510, which acts as a source of policy by providing an interface to virtual and physical policy stores 314. Communication interface 512 abstracts away the communication protocol and data format requirements associated with policy access point 510. Policy access point 510 returns local policy 322 through communication interface 512 to policy aggregator 514 which, using DB layer 516 and JDBC 518, stores local policy 322 in enterprise policy 222 associated with database management system 220.

Policy aggregator 514 may be configured according to enterprise model 226. For each application system 310, policy aggregator 514 may be configured with a communication interface, a network address, and/or security credentials to communicate with one or more policy access points 510 and/or with selection criteria to locate and retrieve application security policy from policy access points 510.

According to a similar embodiment, identity aggregator 524 retrieves identity information associated with application system 310 through communication interface 522 to identity access point 520. Identity access point 520 may act as a source of identity by providing an interface to virtual and physical identity stores 316. Communication interface 522 abstracts away the communication protocol and data format requirements associated with identity access point 520. Identity access point 520 may return identity 324 through communication interface 522 to identity aggregator 524 which, using DB layer 526 and JDBC 528, stores identity 324 in enterprise identity 232 associated with database management system 220.

Identity aggregator 524 may be configured according to enterprise model 226. For each application system 310, identity aggregator 524 may be configured with a communication interface, a network address, and security credentials to communicate with one or more identity access points 520 and/or with selection criteria to locate and retrieve identity information from identity access points 520.

According to another embodiment, resource aggregator 534 retrieves resource information associated with application system 310 through communication interface 532 and resource access point 530. The resource access point 530 may act as a source of resource information by providing an interface to virtual and physical resource stores 318. Communication interface 532 abstracts away the communication protocol and data format requirements of resource access point 530. Resource access point 530 returns resources 326 through communication interface 532 to resource aggregator 534 which, using DB layer 536 and JDBC 538, stores resources 326 in enterprise resources 234 associated with database management system 220.

Resource aggregator 534 may be configured according to enterprise model 226. For each application system 310, resource aggregator 534 may be configured with a communication interface, a network address, and security credentials to communicate with one or more resource access points 530 and/or with selection criteria to locate and retrieve application resource information from resource access points 530.

According to another embodiment, transaction aggregator 544 retrieves transaction data associated with application system 310 through communication interface 542 and event access point 540, which acts as a source of transaction data by providing an interface to virtual and physical transaction store 320. Communication interface 542 abstracts away the communication protocol and data format requirements associated with event access point 540. Event access point 540 returns local transaction data 328 through communication interface 542 to transaction aggregator 544 which, using DB layer 546 and JDBC 548, stores local transaction data 328 in enterprise transaction data 236 associated with database management system 220.

Transaction aggregator 544 may be configured according to enterprise model 226. For each application system 310, transaction aggregator 544 may be configured with a communication interface, a network address, and security credentials to communicate with one or more event access points 540 and/or with selection criteria to locate and retrieve application resource information from event access points 540.

In one embodiment, access points (510, 520, 530, 540) may use various connectors to stores (314, 316, 318, 320) including, but not limited to, Java Database Connectivity (JDBC), Java Management Extensions (JMX), Java Naming and Directory (JNDI), Simple Object Access Protocol (SOAP), Common Information Model (CIM), Service Provisioning Markup Language (SPML), BSD syslog, Web Services Distributed Management (WSDM), Secure Shell (SSH), and File Transfer Protocol (FTP), as well as custom and virtual connectors.

Figure 6:
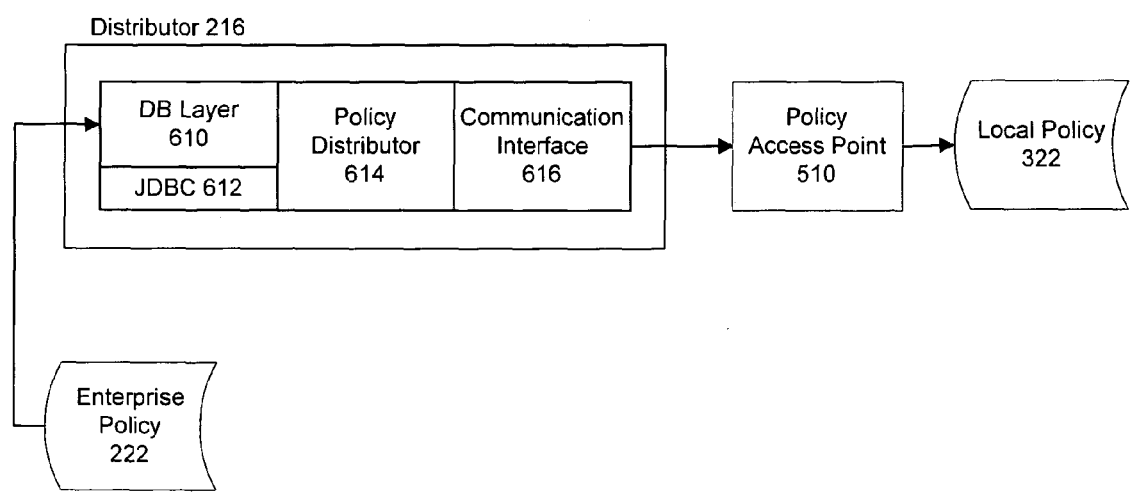
FIG. 6 is a block diagram of an exemplary distributor associated with the policy analytics platform in FIG. 4, according to some embodiments.

FIG. 6 shows one embodiment of policy distributor 216 that provisions policy updates to application system 310. Changes in enterprise policy 222 may be retrieved from database management system 220 through DB layer 610, and JDBC 612. Policy distributor 216 provisions changes through communication interface 616 and policy access point 510 to local policy 322. Communication interface 616 hides the data format and protocol requirements of policy access point 510. Distributor 216 can run in a different process or on a different computing device than analytics system 212.

Figure 7:
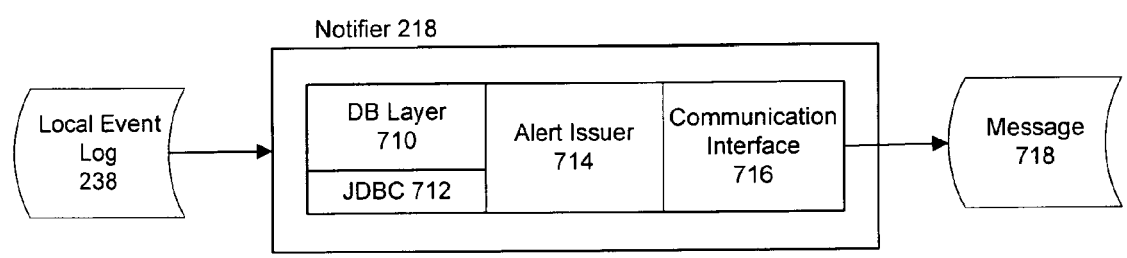
FIG. 7 is a block diagram of an exemplary notifier associated with the policy analytics platform in FIG. 4, according to some embodiments.

FIG. 7 shows one embodiment of notifier 218 that sends message alerts whenever an event is triggered by monitor 414 or some other mechanism. Local event log 238 in database management system 220 is retrieved by alert issuer 714 through DB layer 710 and JDBC 712. Alert issuer 714 sends alert message 718 through communication interface 716 using, by way of illustration, Simple Network Management Protocol (SNMP), Simple Mail Transfer Protocol (SMTP), or Simple Object Access Protocol (SOAP).

Although various changes, local event log 238, and so forth are described as being retrieved from database management system 220 through a DB layer and a JDBC, such as DB layer 610 and DB layer 710, any type of data may be retrieved from database management system 220 via any type of layer or via any type of connectors, as discussed herein, and still fall within the scope of various embodiments.

Figure 8:
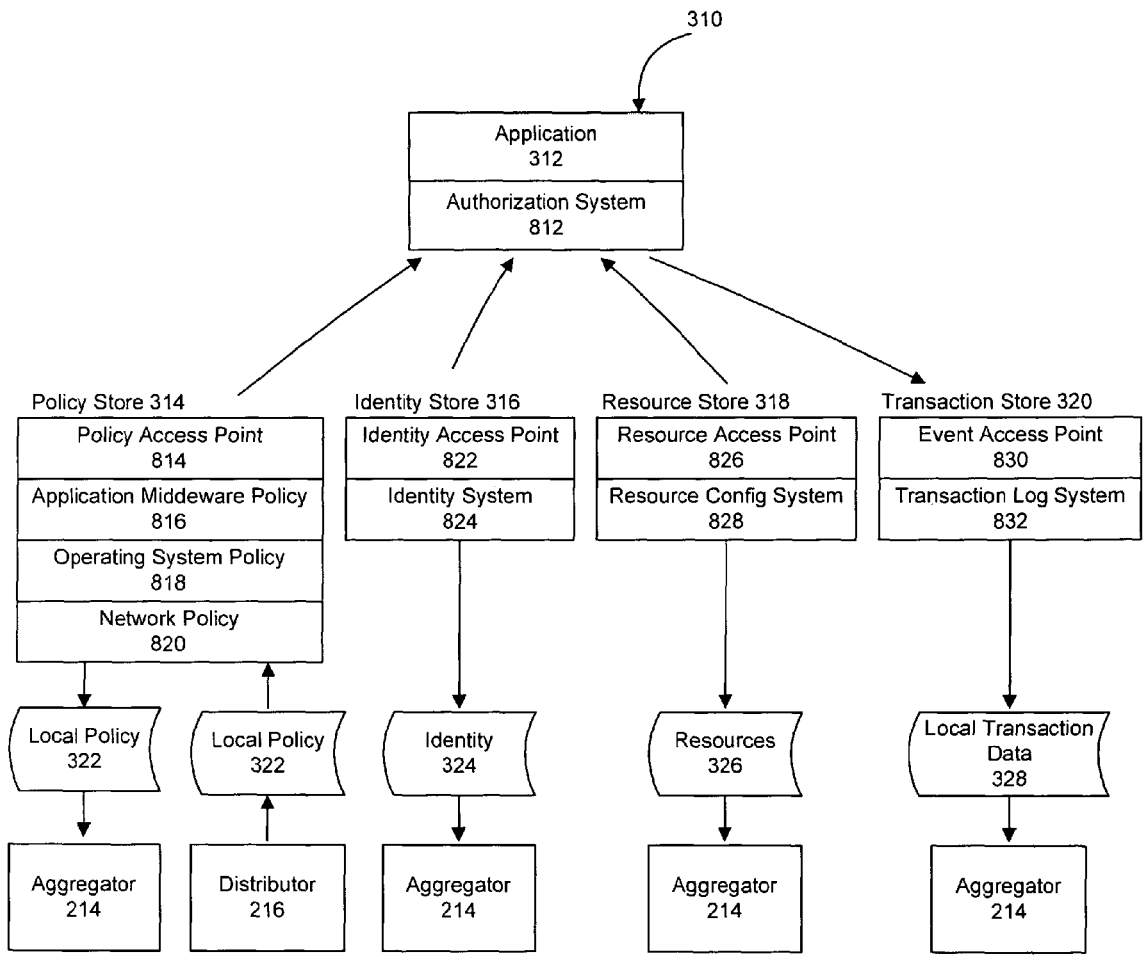
FIG. 8 is a block diagram of an exemplary application system associated with the non-volatile memory in FIG. 3, according to some embodiments.

Referring now to FIG. 8, a block diagram of one embodiment of application system 310, located within non-volatile memory 138 in FIG. 3, is shown.

In various embodiments, application 312 relies on authorization system 812 to control access to sensitive transactions. By way of illustration, application 312 may invoke an external authorization system to decide, based on local policy 322, identity 324, and resources 326, whether a particular transaction associated with application 312 can be accessed by a particular user. The result of this decision may be written to transaction store 320 as local transaction data 328.

FIG. 8 further shows exemplary data elements associated with application 312. The data elements may include, but are not limited to, the following:

Local policy 322 may include an application security policy associated with application 312, as discussed herein, and application's 312 authorization system 812. Local policy 322 may include policy rules on resources for application 312 and is read by application system 310. Local policy 322 may be stored externally in application middleware policy 816, operating systems policy 818, and/or networks policy 820 by means of one or more physical or virtual stores including, but not limited to, Java platforms (J2EE application servers, Java Virtual Machines), directories (LDAP, Active Directory, X.500), databases, files, Network Access Control (NAC) systems, Virtual Private Network application, firewalls, Configuration Management Databases, Systems Management applications, Identity and Access Management systems, web servers, and the security subsystem of operating, file, database, content, network, and storage systems.

Identity 324 may include user and role information, including attributes and hierarchies. In one common embodiment, identity 324 may be stored in an external meta-directory or accessed through a virtual directory. Identity 324 may be managed externally by an identity system 824 and read by application system 310.

Resources 326 may include the protected resources, including application 312, components of application 312, and/or any operating system and network resources required to execute transactions associated with application 312. In one embodiment, resources 326 may be stored in an external centralized meta-directory or accessed through a virtual directory. Resources 326 may include resource information relevant to application 312. Resources 326 may be managed externally by a resource configuration system 828 and read by application system 310.

Local transaction data 328 may include a record of executed transactions associated with application 312, as well as transactions that were disallowed by authorization system 812. In one embodiment, local transaction data 328 may include transaction data relevant to application 312. Local transaction data 328 may be stored internally or externally in a transaction log system 832 and may be read by application system 310.

In FIG. 8, access to policy store 314, identity store 316, resource store 318, and transaction store 320 is provided by means of access point abstractions to various virtual and physical stores. Aggregator 214 retrieves local policy 322 through policy access point 814. Distributor updates local policy 322 through policy access point 814. Aggregator 214 retrieves identity 324 through identity access point 822. Aggregator 214 retrieves resources 326 through resource access point 826 and aggregator 214 can also retrieve local transaction data 328 through event access point 830. Aggregator 214 collects information from the four stores in application system 310 and stores the information in database management system 220, whereas distributor 216 retrieves policy changes from database management system 220 and stores them in policy store 314 in application system 310.

Figure 9:
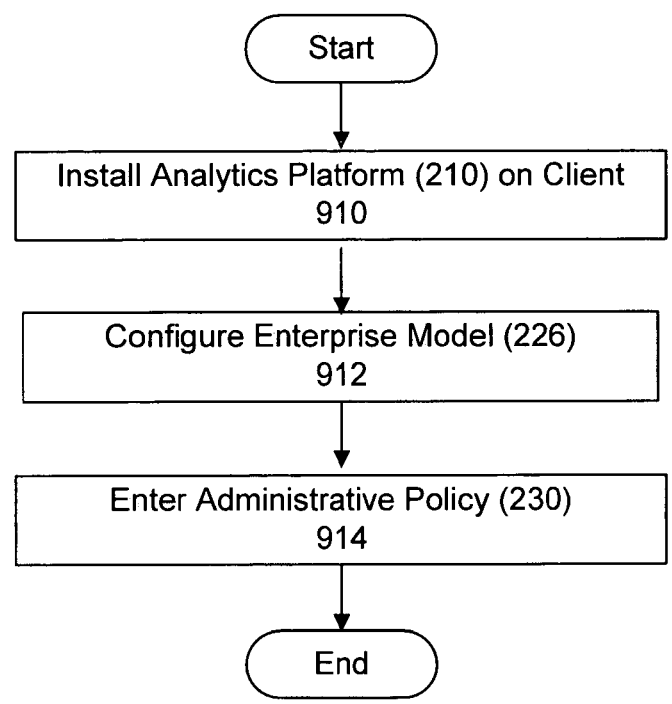
FIG. 9 is a flow diagram illustration of configuring a system, according to some embodiments.

FIG. 9 shows a flow diagram illustration of configuring a system in accordance with various embodiments of the system. Initially, in step 910, a system administrator installs policy analytics platform 210 on a client, such as client 112 discussed herein. The installation may include analytics system 212 and database management system 220. After all components of analytics system 212 have been installed, the system administrator may then, at step 912, configure enterprise model 226. At step 914 the system administrator enters transaction models, connector configurations for use by aggregator 214 and distributor 216, vocabulary mappings for vocabulary engine 426, and/or alert configurations for notifier 218, any or all of which may be saved in enterprise model 226. At step 914, the system administrator enters an administration policy that is stored in local administration policy 230.

Figure 10:
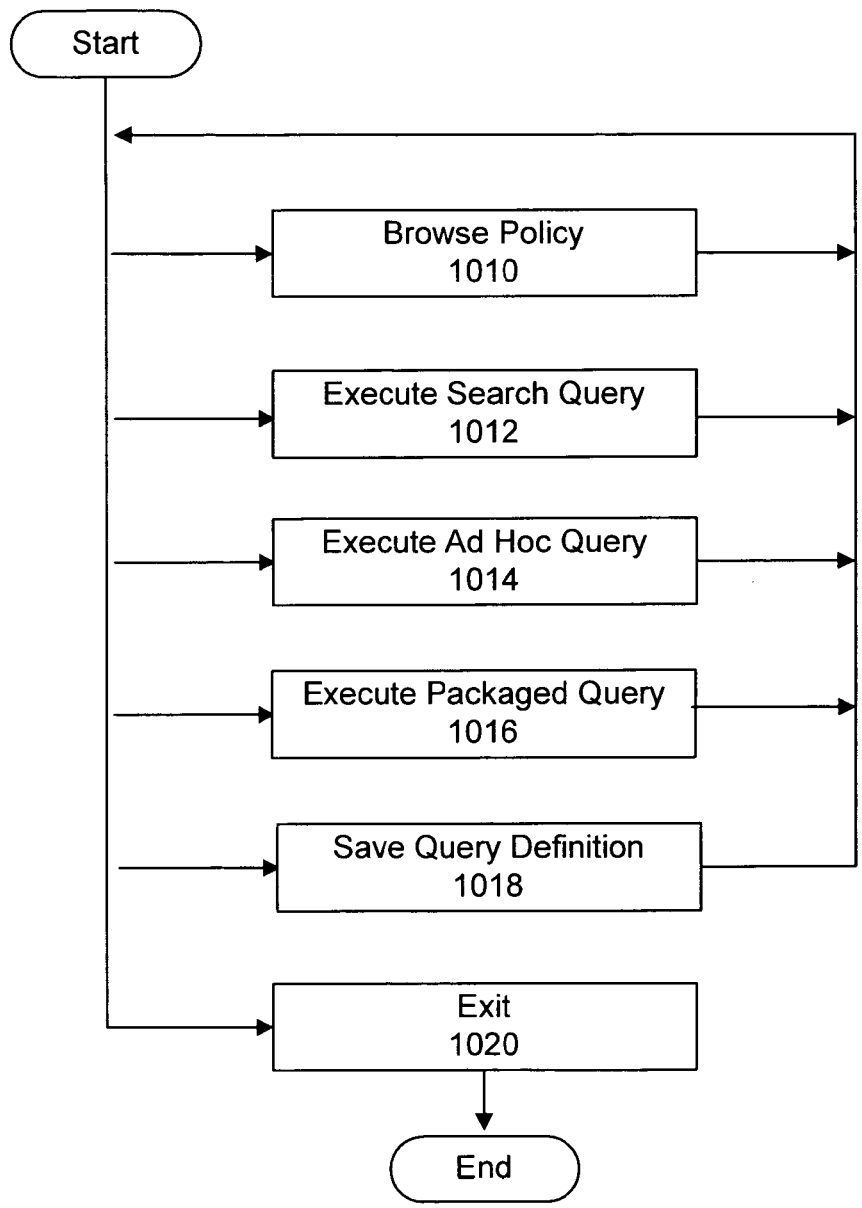
FIG. 10 is a flow diagram illustration of analyzing policy, according to some embodiments.

Referring now to FIG. 10, a flow diagram of one embodiment of analyze 412 in analytic services 410, which provides various kinds of analysis to help system users better understand policy information, is shown. System users are presented with various options, including browse policy 1010, execute search query 1012, execute ad hoc query 1014, execute packaged query 1016, save query definition 1018, and/or exit 1020. A system user may choose any of the options, or at step 1020 exit the service. In some embodiments, fewer or more options are provided via analyze 412.

Browse policy 1010 may provide for structural navigation of enterprise policy 222, enterprise model 226, enterprise identity 232, enterprise resources 234, and/or enterprise transaction data 236 in database management system 220. Since optimized policy 224 may include the indexes that relate these five database elements, the system user, for example, may enter the name of a resource and the system may return a list of all relevant identity, resource, rule, transaction, and/or model information. Because of the extensive indexing in optimized policy 224, the system user may not need to look at any irrelevant information, according to some embodiments.

Execute search query 1012 may take as input a search query and return a list of matches, or hits, possibly ordered by a relevance score. Execute ad hoc query 1014 may take as input a policy query, and return a vocabulary-mapped set including the allowed and disallowed access on the resources in the query, as well as any constraints on the access. For example, a query result may say that JDoe can access a particular account on Tuesday, but not on any other day. Execute packaged query 1016 takes as input a logical composition of one or more queries and instances for any free variables, and returns the evaluated composition with explanatory policy details. Save query definition 1018 takes as input one or more search queries and/or one or more ad hoc queries, possibly with variables, and saves the query definition in query definitions 228 in database management system 220. At step 1020 the system user exits analyze service 412.

Figure 11:
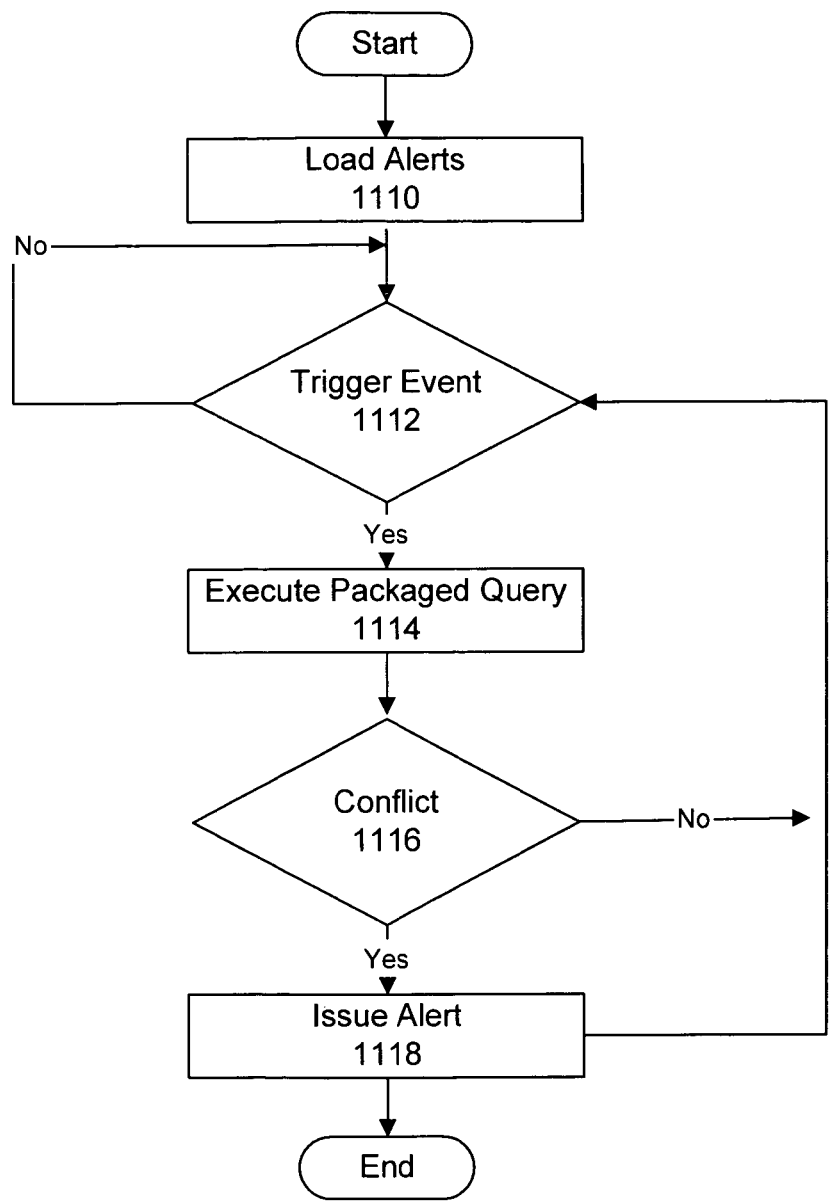
FIG. 11 is a flow diagram illustration of monitoring queries, according to some embodiments.

FIG. 11 shows a flow diagram illustration of how monitor 414 service, continuously or periodically, monitors packaged queries in query definitions 228 of database management system 220. Load alerts 1110 retrieves alert configurations from enterprise model 226 in database management system 220. An alert may include a trigger, a packaged query, an expected result, and/or notification parameters. A trigger may comprise an event in local event log 238, such as an event indicating that enterprise policy 222 has changed, or an event internal to monitor 414, such as a timer indicating when and how often monitoring should occur. A packaged query may be referred to by a name associated with, or assigned to, the packaged query. An expected result may comprise an exact value, such as True, or a threshold, such as a maximum number of resources, a pattern of values, a range of values, and so forth.

Next, trigger event 1112 may continuously loop until trigger event 1112 receives an event that, according to the alert configurations, may trigger an alert. Trigger event 1112 generates the alert by placing an entry in local event log 238 in database management system 220 and sends an alert request to notifier 218. Execute packaged query 1114 (like 1016) takes as input a unique reference to a saved packaged query, retrieves the query from query definitions 228, instantiates the query, and passes the query to query preprocessor 424 for execution. Conflict 1116 may compare the actual values returned by the packaged query against expected values for the packaged query in the alert configurations. If there is a divergence between the expected result and an actual result, issue alert 1118 may pass an appropriate event record to trigger event 1112, whereas, if the actual result is the same as the expected result, no event record is sent to trigger event 1112. According to one embodiment, the divergence may fall within or outside of the threshold, the pattern of values, and/or the range of values. If the divergence falls within the threshold, the pattern of values, and/or the range of values, notifier 218 does not issue the alert. Otherwise, where the divergences falls outside of the threshold, the pattern of values, and/or the range of values, notifier 218 issues the alert.

Figure 12:
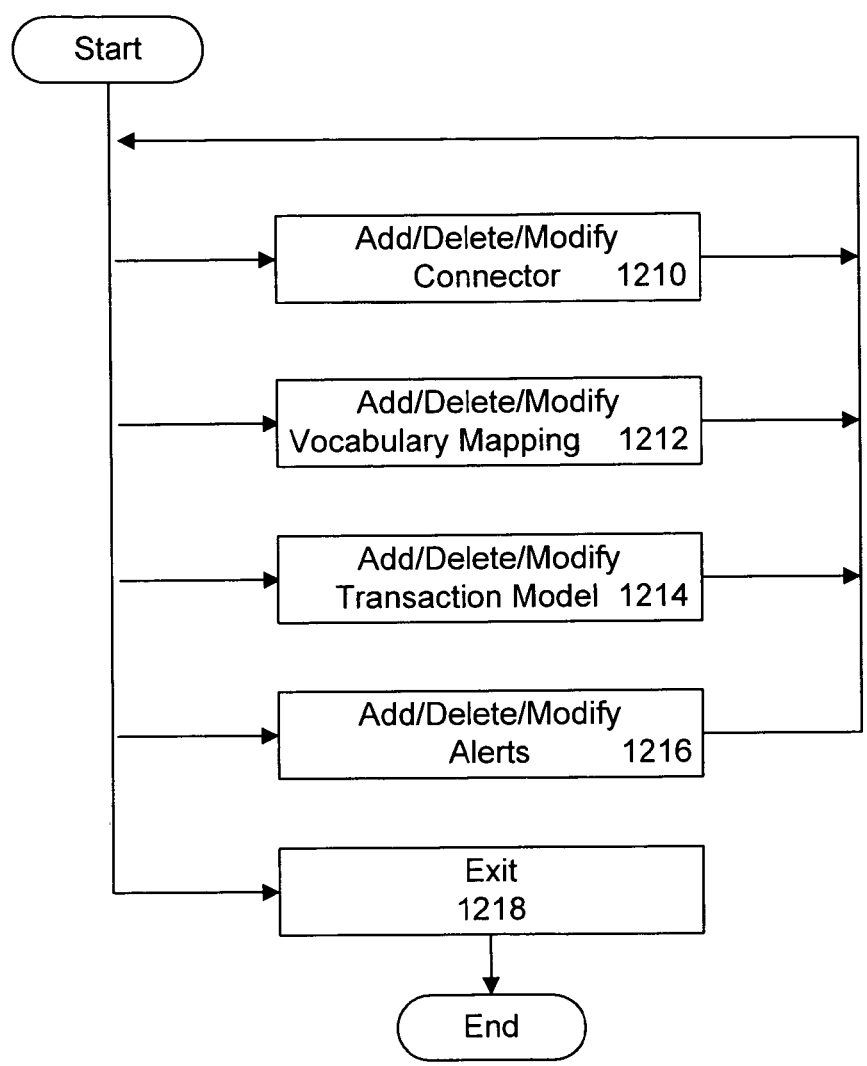
FIG. 12 is a flow diagram illustration of configuring an enterprise model, according to some embodiments.

FIG. 12 shows a flow diagram illustration of an exemplary model 416 service for configuring enterprise model 226 in database management system 220. A set of options is provided for the system user to add, delete, and/or modify elements in enterprise model 226 to include system configurations, transaction models, vocabulary mappings, alerts, and connectors. According to some embodiments, the system user can add, delete, and/or modify various other elements associated with enterprise model 226. At step 1218 the system user may then exit from configure enterprise model.

Figure 13:
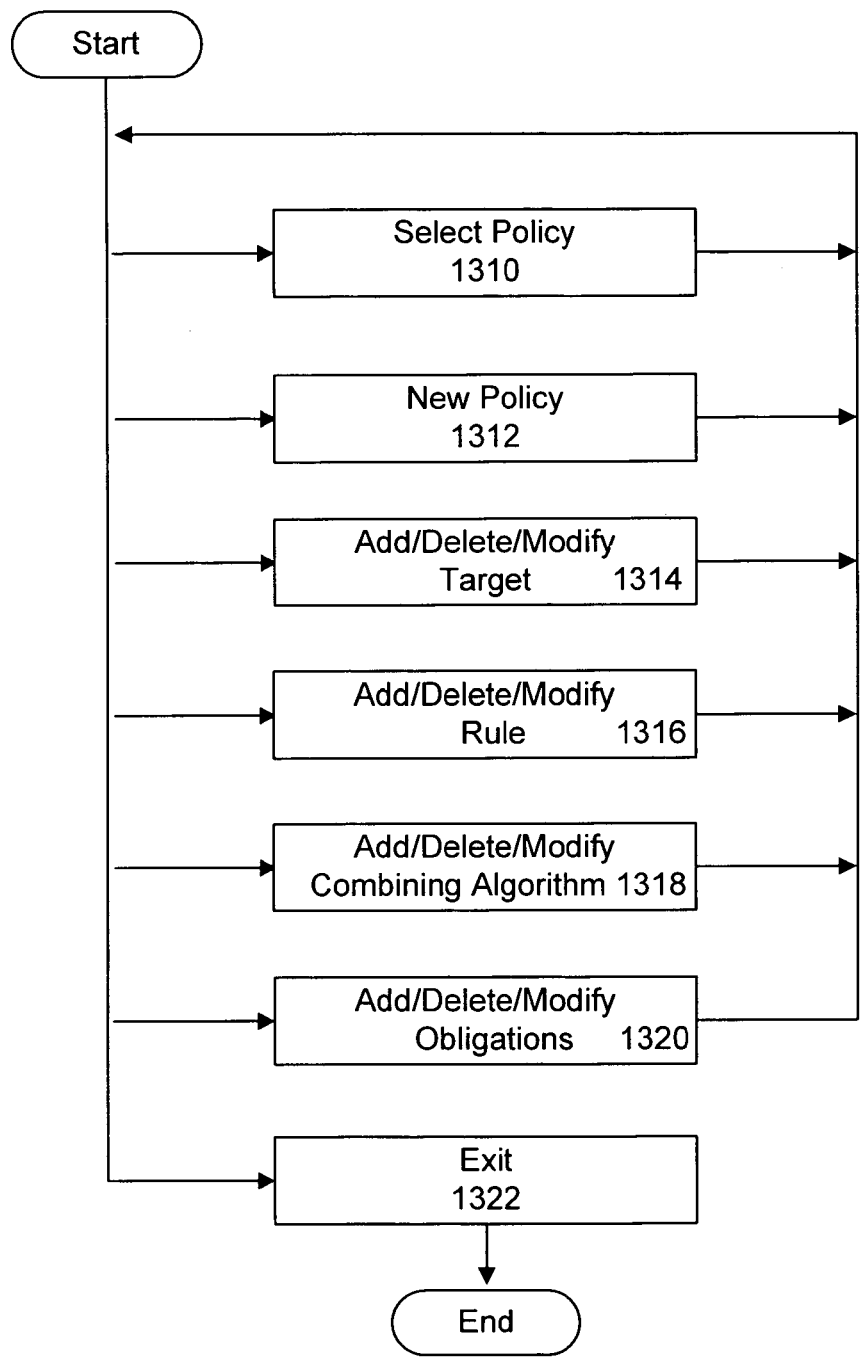
FIG. 13 is a flow diagram illustration of editing policy, according to some embodiments.

FIG. 13 shows a flow diagram illustration of edit service 418 for editing enterprise policy 222 in database management system 220. At step 1310, the system user may begin by selecting an existing application security policy, which may include the structured application security policy according to exemplary embodiments. The existing application security policy syntax may be edited at the service layer as XACML structures. At step 1312, the system user may choose to create a new policy. Various operations may be provided for editing and creating the new application security policies or the existing application security policies in terms of operations on the XACML abstract syntax tree, including the ability to add, delete, and/or modify an XACML target 1314, rule 1316, combining algorithm 1318, and obligations 1320. Edit service 418 may provide standard text editing operations on unstructured application security policies, according to some embodiments.

Figure 14:
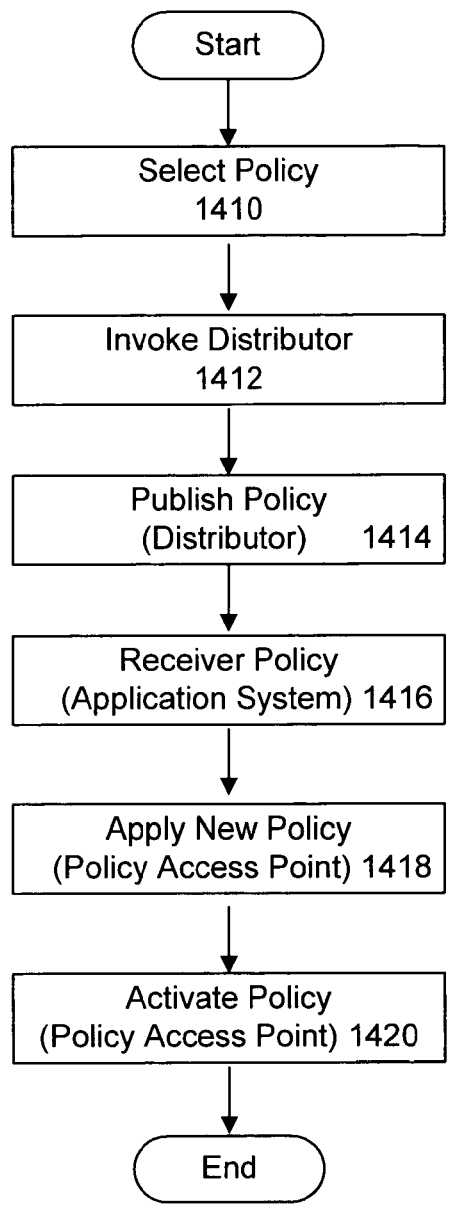
FIG. 14 is a flow diagram illustration of provisioning policy, according to some embodiments.

FIG. 14 shows a flow diagram illustration of provision 420 service that distributes local policy 322 from enterprise policy 222 in database management system 220 to application systems 310. The system user begins at step 1410 by selecting the application security policy from enterprise policy 222. Next, at step 1412, the system user invokes distributor 216 in analytics system 212. At step 1414, distributor 216 publishes the application security policy over network 114. At step 1416, application system 310 receives the application security policy, installs the application security policy at step 1418, and then activates the application security policy at step 1420. The installation and activation steps may be simplified by means of a policy access point, such as policy access point 510.

Figure 15:
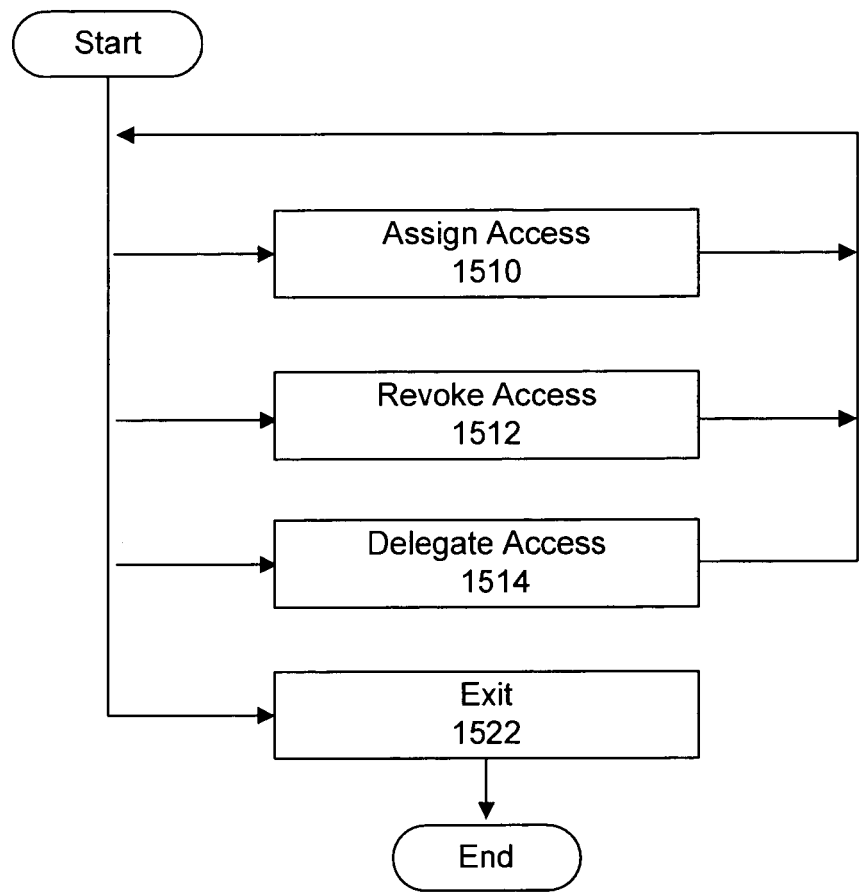
FIG. 15 is a flow diagram illustration of editing administration policy, according to some embodiments.

FIG. 15 shows a flow diagram illustration of exemplary editing of local admin policy 230 according to one embodiment. Administer 422 may be utilized to edit the application security policy, for policy analytics platform 210, stored in local admin policy 230 in database management system 220. Administer 422 may be designed to support the assignment of administrative rights at step 1510, revocation of administrative rights at step 1512, and/or delegation of administrative rights at step 1514. At step 1510, system users may be assigned to various roles to limit the scope of what administrative rights they can delegate and to whom. The service-level representation of administrative policy may be XACML, but the administrative policy may be transformed by an external client of administer 422 into a format suitable for a system user, an application, and/or a service.

Figure 16:
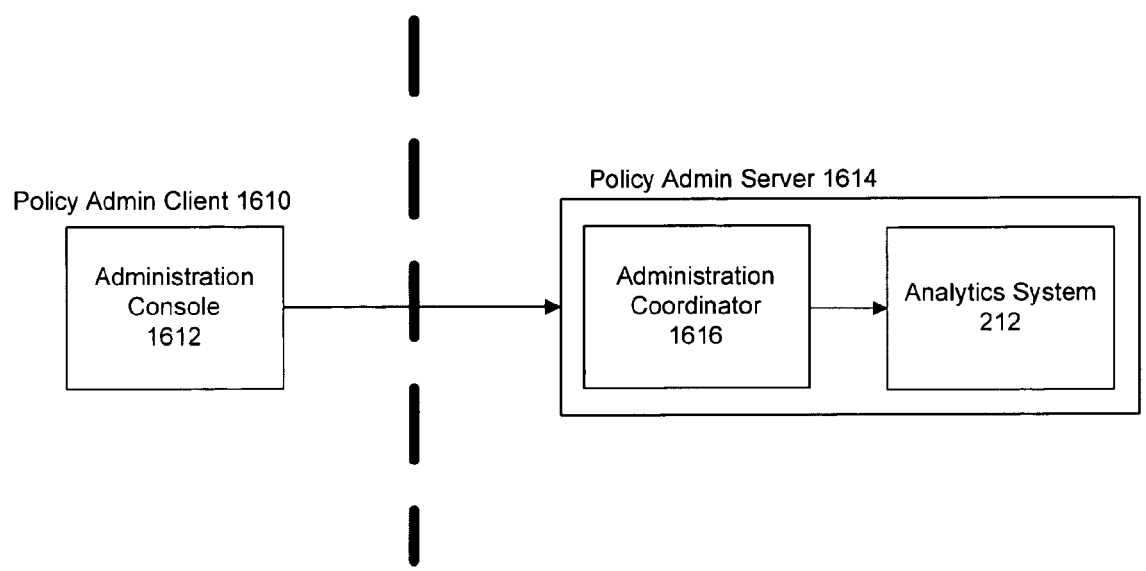
FIG. 16 is a block diagram of an exemplary policy administration client and server, according to some embodiments.

FIG. 16 shows an exemplary embodiment of how system users may interact with policy analytics platform 210. A policy administration client 1610 may include an administration console 1612 that allows system users to easily configure and manage various aspects of the system through a unified administrative interface. Through administration console 1612, the system users may interact over a network, such as network 114, or a separate network according to some embodiments, with analytic services 410 to analyze 412, monitor 414, model 416, edit 418, provision 420, and/or administer 422. Administration coordinator 1616 may serve as a broker between policy administration client 1610 and analytics system 212. By way of illustration, administration console 1612 may have a dashboard of information that administration coordinator 1616 decomposes into parts for the various services, such as analyze 412, associated with analytic services 410.

Figure 17:
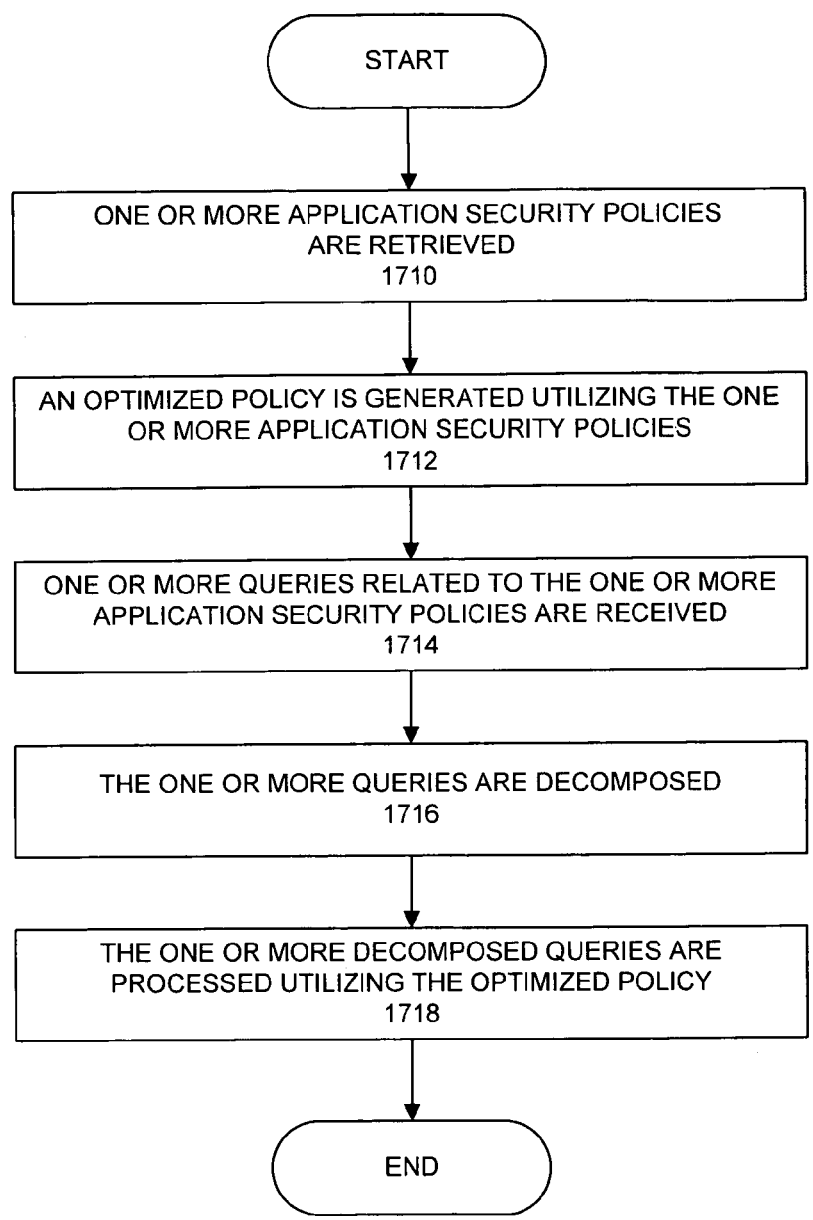
FIG. 17 is a flow diagram illustrating an exemplary process for analyzing application security policies.

FIG. 17 shows a flow diagram of one embodiment of an exemplary process for analyzing application security policies, such as the application security policies discussed herein. At step 1710, one or more application security policies are retrieved. As discussed herein, in various embodiments, aggregator 214 can retrieve the application security policies from one or more application systems 310. In various embodiments, the one or more application security policies may be transformed into a common format. According to some embodiments, the one or more application security polices comprise structured data and/or unstructured data. For example, aggregator 214 may retrieve application security policies and communicate with transformer 434 to transform the structured application security policies into an XML format and the unstructured application security policies into a textual format.

At step 1712, an optimized policy is generated. As discussed herein, the optimized policy may be generated utilizing the one or more application security policies. For example, indexing engine 428 may create optimized policy 224 for structured and/or unstructured application security policies, as discussed herein.

At step 1714, one or more queries related to the one or more application security polices are received. For example, a system user may enter a query to find the employees who can approve trades over $100,000. According to exemplary embodiments, a query is represented by a specialized logical expression and/or by a search expression.

At step 1716, the one or more queries are decomposed. In various embodiments, one or more objects may be associated with a common object. Each of the one or more objects may comprise at least one name. For example, query preprocessor 424 may decompose queries into base queries while taking into account that an object may be known by one or more names in one or more application security policies. By way of illustration, the resource named "Trading" in one application security policy and the resource named "Trades" in another, denote the same trading system.

At step 1718, one or more decomposed queries are processed utilizing the optimized security policy. For example, deductive engine 430 may process base queries with respect to the structured application security policies.

While various embodiments have been described above, it should be understood that they have been presented by way of example only, and not limitation. For example, any of the elements associated with policy analytics platform 210 and application system 310 may employ any of the desired functionality set forth hereinabove. Thus, the breadth and scope of a preferred embodiment should not be limited by any of the above-described exemplary embodiments.

What is claimed is:

1. A system for analyzing a software application security policy, the system comprising:
 an aggregation module in communication with a computing device, the computing device in communication with an application security policy, the application security policy specifying at least in part whether a particular subject can access a particular resource;
 the aggregation module retrieving the application security policy;

an indexing engine in communication with the aggregation module, the indexing engine generating an indexed application security policy utilizing the application security policy;

a query preprocessor module in communication with the indexing engine, the query preprocessor module decomposing a query; and an analysis engine in communication with the query preprocessor module, the analysis engine processing the decomposed query utilizing the indexed application security policy.

2. The system recited in claim 1, wherein the application security policy comprises structured and unstructured data.

3. The system recited in claim 1, further comprising a transformation module in communication with the aggregation module, the transformation module transforming the application security policy into a common format.

4. The system recited in claim 1, further comprising a vocabulary engine in communication with the query preprocessor module, the vocabulary engine associating one or more objects with a common object.

5. The system recited in claim 4, wherein each of the one or more objects comprises at least one name.

6. The system recited in claim 1, wherein the application security policy comprises structured data.

7. The system recited in claim 1, wherein the application security policy comprises unstructured data.

* * * * *